Patented Oct. 22, 1935

2,017,942

UNITED STATES PATENT OFFICE 2,017,942

EXTRACTION OF VITAMINS

Sophie Botcharsky, London, England, assignor of one-fifth to Solomon Teitelbaum

No Drawing. Application April 2, 1932, Serial No. 602,878. In Great Britain June 25, 1931

6 Claims. (Cl. 167—81)

This invention relates to fat soluble vitamins such as vitamin A and the like and particularly to their mode of extraction in a highly concentrated form for dietary and medical purposes.

More particularly, the invention has for its object the extraction of fat soluble vitamins in large quantities and in highly concentrated form by comparatively simple and cheap methods from inexpensive and readily available raw materials.

Another object of the invention is to employ a process of extraction of fat soluble vitamins which retains the vitamins of the original food source in substantially the same amounts and having the same degree of activity.

A further object of the invention is to preserve the vitamin materials against harmful oxidation by maintaining an inert atmosphere thruout the steps of the process.

Another object of the invention is to employ solvents for the vitamin materials which have sufficiently high volatility to allow recovery of the highly concentrated vitamins without impairment or loss.

Heretofore in the extraction of fat soluble vitamins, various chemical treatments have been employed, outstanding among which is saponification. By these treatments some of the vitamins are destroyed and notably, a decided loss of vitamin A is experienced. These treatments have been found to render the vitamin products of decidedly inferior quality and feeble action. Whereas water soluble vitamins have been produced successfully in a more or less concentrated form by various methods, there has not been developed up to the present time a successful means for producing a fat soluble vitamin in highly concentrated form.

While in the past precautions have been taken to avoid high temperatures, light, and air in the process of extraction of vitamins, no attempt has been made to completely expose the vitamins contained in the food cells to the action of the solvent employed.

My invention overcomes these faults and failures by providing a new and effective process which will now be described.

According to the present invention, the cells of the material from which the vitamins are extracted (hereafter called food source) are caused to be disintegrated or burst by mechanical and/or physical means in an atmosphere of inert gas, nitrogen by way of example. The disintegrating cells are dried at a moderate temperature whereupon the vitamins are extracted by means of a suitable solvent. Subsequently the solvent is distilled in a vacuum, the residue being active vitamin in a highly concentrated form.

Among the food sources of fat soluble vitamins contemplated by this invention are fish or animal livers, kidney fat, egg yolks and vegetables rich in vitamin. This list is not intended to be exhaustive or exclusive but merely gives some examples.

In order that this invention may be fully understood I shall describe it with reference to the use of animal liver as the food source. This is given merely as a typical illustration of my process.

The liver is first minced and then soaked for 24 hours or longer in a saturated solution of sodium bicarbonate, sodium chloride, or other nonpoisonous salt for the purpose of bringing about the effect of plasmolysis and the attendant result of bursting of the cell walls. The minced liver in the solution is then quickly mixed with a definite quantity of water heated to a definite temperature so as to obtain a mixture of temperature not exceeding 75° C. This water has been previously boiled or otherwise treated so as to completely deaerate it, and the whole mixing operation is performed in an inert atmosphere such as nitrogen, carbon dioxide or the like. Upon mixture with hot water any remaining whole cells of the minced liver burst, thus exposing the vitamins completely to the action of the solvent to be employed.

As an alternative step to the use of hot water, the minced liver in the solution may be subjected to a slow freezing which causes bursting of the remaining whole cells in a similar manner. Following this the substance may be warmed somewhat, say to 15° C., filtered under pressure and dried.

If the hot process be used, the mixture is then subjected to quick cooling in an inert atmosphere, as nitrogen, filtered and then refiltered under pressure, whereupon the compressed mass is dried in an oven at a moderate temperature (about 55 to 60° C.) and at sub-atmospheric pressure. The dried mass is subsequently cooled.

The cooled dry mass from the hot process or the dried mass from the cold process is next crushed or grated into the form of powder and extracted with a proper amount of suitable solvent having a low boiling point as compared to that of water; say about twice its volume of petroleum ether (boiling range 45° C.) or as another example pure alcohol, 95°, for a suitable time, say 6 hours.

The mixture is then filtered and the solvent distilled off at a moderate temperature, for example on a suitable bath such as water, and in a vacuum. The solvent is largely recovered and in a substantially pure state, the fats remaining in the residue as the distillation is performed at a temperature materially below the point of volatility of the fat.

All of these steps are carried out, whenever possible in an inert atmosphere, nitrogen or some other suitable gas.

The residue, after the distillation of the solvent, is the concentrated fat soluble vitamin, predominantly vitamin A.

This final product has neither smell nor taste, and presents a golden yellow color. It is soluble in oils and also in the usual fat solvents such as ether, alcohol, etc. The curative dose is about 0.25 gram, the preventive dose being accordingly smaller.

It will be understood that various other food sources may be employed in the extraction of the vitamins and various modifications in the steps of the process of the example may be made. Further it will be understood that the invention is not restricted to the various food sources, temperatures, times or reagents exemplified except as restricted by the appended claims.

1. The process of extracting fat soluble vitamins from food sources comprising mincing the food and subjecting the same to plasmolysis, causing any remaining whole cells of the food to burst by the addition of a suitable quantity of deaerated hot water of such temperature that the resultant mixture does not exceed 75° C., cooling the mixture, filtering the same under pressure, drying the residue at a relatively low temperature below atmospheric pressure and cooling and crushing the same, and extracting it with a low boiling solvent for the fat soluble vitamins, filtering and distilling off the solvent at low temperature in a vacuum, all of which steps are carried on in an inert atmosphere.

2. The process of extracting fat soluble vitamins from food sources comprising mincing the food and subjecting the same to plasmolysis, causing any remaining whole cells of the food to burst by subjecting the mixture to slow freezing, slightly warming the mixture, filtering it under pressure, drying and crushing the same, and extracting it with a low boiling solvent for the fat soluble vitamins, filtering and distilling off the solvent at low temperature in a vacuum, all of which steps are carried on in an inert atmosphere.

3. A highly concentrated, odorless and tasteless fat soluble vitamin extraction product containing substantially the full amount of vitamin material present in the source of extraction combined with the fats of the source of extraction, said product being obtained by a process combining the steps of plasmolysis and solvent extraction.

4. The process of extracting fat soluble vitamins from food sources including bursting the food cells by the combined action of plasmolysis and heat at a temperature at which the vitamins are not destroyed and removing the vitamin constituents by a suitable solvent for the fat soluble vitamins.

5. The process of extracting fat soluble vitamins from food sources including bursting the food cells by the combined action of plasmolysis freezing and removing the vitamin constituents by suitable solvents for the fat soluble vitamins.

6. The process of extracting fat soluble vitamins from food sources comprising mincing the food, bursting the food cells by the addition of hot deaerated water, extracting the vitamin content with a solvent for the fat soluble vitamins, and distilling to remove the solvent, the temperature throughout the process being maintained below that at which the vitamins are destroyed.

SOPHIE BOTCHARSKY.